United States Patent [19]
Feldman

[11] Patent Number: 4,766,607

[45] Date of Patent: Aug. 23, 1988

[54] METHOD OF IMPROVING THE SENSITIVITY OF THE EARPHONE OF AN OPTICAL TELEPHONE AND EARPHONE SO IMPROVED

[76] Inventor: Nathan W. Feldman, 910 Van Court Ave., Long Branch, N.J. 07740

[21] Appl. No.: 31,815

[22] Filed: Mar. 30, 1987

[51] Int. Cl.$^4$ .................................... H04B 9/00

[52] U.S. Cl. .................................... 455/612; 455/614; 455/619

[58] Field of Search ............... 455/606, 612, 614, 617, 455/619

[56] References Cited

U.S. PATENT DOCUMENTS

| | | | |
|---|---|---|---|
| 4,002,897 | 1/1977 | Kleinman et al. | 455/614 |
| 4,057,772 | 11/1977 | Basil, Jr. et al. | 333/234 |
| 4,334,321 | 1/1982 | Edelman et al. | 455/614 |
| 4,503,564 | 3/1985 | Edelman | 455/614 |
| 4,566,135 | 1/1986 | Scmidt | 455/619 |

FOREIGN PATENT DOCUMENTS

| | | | |
|---|---|---|---|
| 2639822 | 12/1977 | Fed. Rep. of Germany | 455/619 |

*Primary Examiner*—Robert L. Griffin
*Assistant Examiner*—L. Van Beek
*Attorney, Agent, or Firm*—Sheldon Kanars; Roy E. Gordon

[57] ABSTRACT

The sensitivity of the earphone of an optical telephone that contains a gas filled tube that reacts to small changes in temperature caused by amplitude variations in light to create sound is improved by replacing the gas tube opto-acoustic converter with a strip of a material that reacts forcefully when heated and cooled so that the sensitivity of the optical telephones opto-acoustic converter can be increased and transmission quality improved.

2 Claims, 1 Drawing Sheet

Figure 2:
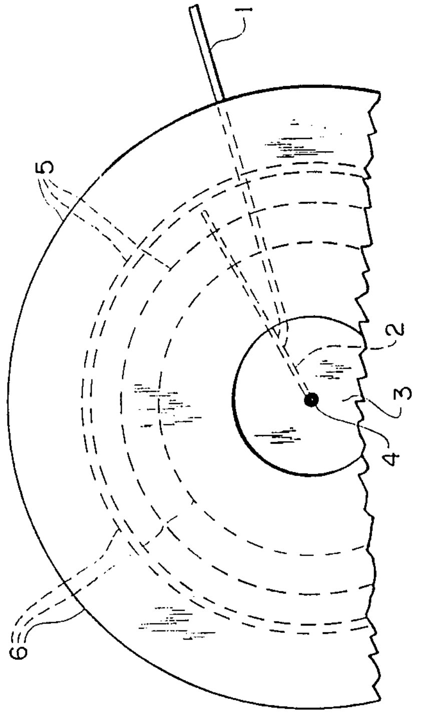

METHOD OF IMPROVING THE SENSITIVITY OF THE EARPHONE OF AN OPTICAL TELEPHONE AND EARPHONE SO IMPROVED

The invention described herein may be manufactured, used, and licensed by or for the Government for governmental purposes without the payment to me of any royalties thereon.

This invention relates in general to a method of improving the sensitivity of an optical telephone and to the optical telephone so improved and in particular to a method of improving the sensitivity of the earphone of an optical telephone and to the earphone so improved.

BACKGROUND OF THE INVENTION

In a optical telephone it is required to convert amplitude modulated light to sound or mechanical energy. Most often this is done by converting the modulated light into electrical energy and then feeding this to an electro-mechanical transducer or earphone. The "Photophone" patented by Bell and Tainter, does this using the temperature/volume characteristics of a gas. The modulated light (varying optical energy) is applied to an enclosed volume of special gas. The volume of this gas varies in synchronism with instantaneous energy of the modulated light. In this variation, the sounds are produced. This is likely to be an inefficient mechanism.

SUMMARY OF THE INVENTION

The general object of this invention is to provide a method of increasing the sensitivity of the earphone of an optical telephone. A more particular object of this invention is to provide a method of improving the efficiency of the gas tube opto-acoustic converter of the earphone of an optical telephone.

It has now been found that the aforementioned objects can be attained by replacing the gas tube opto-acoustic converter with a strip of a material that reacts forcefully when heated and cooled.

As the strip of material that reacts forcefully when heated and cooled, the invention contemplates the use of materials that are sensitive to changes in temperature, such as: materials with a thermal memory; and bimetallic thermal elements. A particularly desireable material is an alloy of nickel and titanium of about 40 to 45 weight percent titanium to about 60 to 55 weight percent nickel.

What occurs in the earphone of the optical telephone according to this invention is that light from a suitable source as for example, an optical fiber, is converted into thermal energy. The varying thermal energy then varies the temperature of the strip of material that reacts forcefully when heated and cooled. The varying temperature causes movement of the material. The movement of the material then moves the diaphragm to which it is coupled causing or generating sound.

What this invention does is to reduce the amount of optical energy required to produce the required amount of sound or acoustic energy. For example, the optimized basic photophone requires two to three milliwatts of mean optical energy to produce a sound level of 78 decibels. It is expected that the use of the system of this invention will reduce the required amount of mean optical energy by three to six decibels.

DESCRIPTION OF THE DRAWING AND THE PREFERRED EMMBODIMENT

Figure 1:
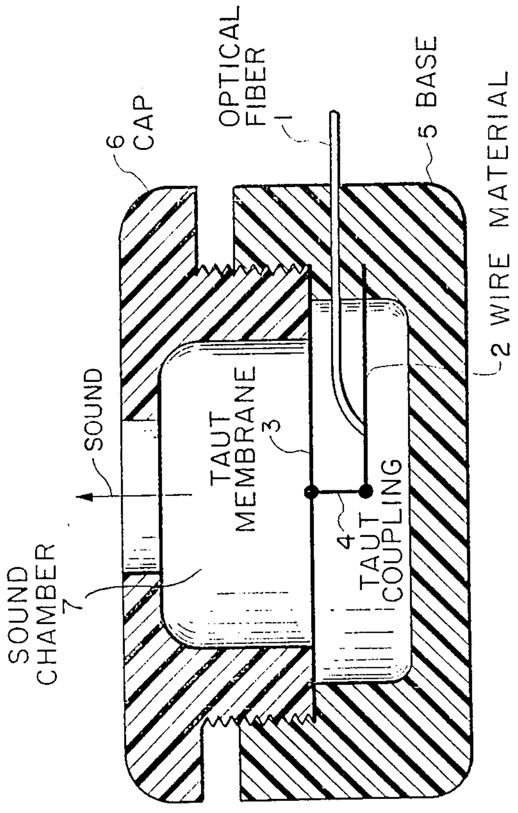

FIG. 1 is a cross sectional view of an earphone of an optical telephone according to the invention, and FIG. 2 is a partial top view of an earphone of an optical telephone according to the invention.

Referring to FIG. 1 and FIG. 2, there is represented a construction similar to the normal electrical earphone (sound transducer). There is the base, 5, of the earphone for holding the working parts: The taut membrane, 3, equivalent to the vibrating diaphragm; and the cap, 6, to match the sound chamber, 7, to the ear. Here, the similarity departs. The taut membrane, 3, is actuated by the strip of wire material or flat wire, 2, that reacts forcefully when heated and cooled, and which is connected to it by means of a taut coupling, 4. The wire material, 2, has the end that is not attached to the taut coupling, 4, firmly embedded in the wall of the base, 5, of the earphone. Motion of the non embedded end of the wire material, 2, results from its varying temperature that in turn results from the varying intensity of light issuing at it from the optical fiber, 1. The surface of the wire material, 2, can be treated to optimize the conversion of the instantaneous optical energy, from the optical fiber, 1, to thermal energy. The resulting variations in the temperature of the wire material, 2, causes movement of the end connected to the taut coupling, 4, thus causing motion of the taut membrane, 3, that results in changes of pressure (sound) in the sound chamber, 7.

It should be pointed out that the method of the invention makes it more advantageous to extend the present fiber optic portion of the new communication system to include the end subscriber.

Moreover, a small pressure relief hole may be provided in the base of the earphone to prevent pressure building in the space occupied by the wire element.

I wish it to be understood that I do not desire to be limited to the exact details as described for obvious modifications will occur to a person skilled in the art.

What is claimed is:

1. An improved earphone for an optical telephone, said earphone including a base and a cap positioned above said base, a sound chamber contained within said cap, a taut membrane extending horizontally through said base, a strip of bimetallic thermal element with thermal memory that reacts forcefully when heated and cooled being positioned beneath and spaced from said taut membrane by means of a taut coupling extending from said taut membrane to one end of said strip of bimetallic thermal element with thermal memory and wherein the other end of said strip of bimetallic thermal element with thermal memory is firmly embedded in the wall of the base of the earphone, and an optical fiber extending from the strip of bimetallic thermal element with thermal memory through the base of the earphone so that motion of the non-embedded end of the stip of bimetallic thermal element with thermal memory results from the varying temperature of the strip of bimetallic thermal element with thermal memory that results from the varying intensity issuing at the strip of bimetallic thermal element with thermal memory from the optical fiber.

2. An improved earphone for an optical telephone, said earphone including a base and a cap positioned above said base, a sound chamber contained within said cap, a taut membrane extending horizontally through said base, a strip of an alloy of nickel and titanium of about 40 to 45 weight percent titanium to about 60 to 55 weight percent nickel with thermal memory that reacts forcefully when heated and cooled being positioned beneath and spaced from said taut membrane by means of a taut coupling extending from said taut membrane to one end of said strip of alloy and wherein the other end of said strip of alloy is firmly embedded in the wall of the base of the earphone, and an optical fiber extending from said strip of alloy through the base of the earphone so that motion of the non-embedded end of the strip of alloy results from the varying temperature of the strip of alloy that results from the varying intensity issuing at the strip of alloy from the optical fiber.

* * * * *